(12) United States Patent
Kerns

(10) Patent No.: US 7,695,620 B2
(45) Date of Patent: Apr. 13, 2010

(54) TERTIARY FILTER SEPTIC SYSTEM AND METHOD

(76) Inventor: Curt Kerns, 13325 Prospect Drive, Ladysmith, BC (CA) V9G 1G9

( * ) Notice: Subject to any disclaimer, the term of this patent is extended or adjusted under 35 U.S.C. 154(b) by 0 days.

(21) Appl. No.: 12/175,330

(22) Filed: Jul. 17, 2008

(65) Prior Publication Data

US 2009/0127173 A1    May 21, 2009

Related U.S. Application Data

(62) Division of application No. 10/943,022, filed on Sep. 17, 2004, now Pat. No. 7,407,577.

(51) Int. Cl.
 *C02F 3/32* (2006.01)
(52) U.S. Cl. ........................ 210/602; 210/747
(58) Field of Classification Search .............. 210/602, 210/605, 620, 630, 747; 405/128.1, 128.15
See application file for complete search history.

(56) References Cited

U.S. PATENT DOCUMENTS

| | | | |
|---|---|---|---|
| 2,346,029 | A | 4/1944 | Jennings |
| 4,133,141 | A | 1/1979 | Lee |
| 4,287,682 | A | 9/1981 | Browne |
| 4,326,923 | A | 4/1982 | Mortenson |
| 4,415,450 | A | 11/1983 | Wolverton |
| 4,752,402 | A | 6/1988 | Gray |
| 4,926,585 | A | 5/1990 | Dreschel |
| 4,999,947 | A | 3/1991 | Whitaker |
| 5,017,040 | A | 5/1991 | Mott |
| 5,043,061 | A | 8/1991 | Inagaki |
| 5,046,282 | A | 9/1991 | Whitaker |
| 5,049,265 | A | 9/1991 | Boyd et al. |
| 5,637,218 | A | 6/1997 | Kickuth |
| 5,690,827 | A | 11/1997 | Simmering et al. |
| 5,951,866 | A | 9/1999 | Grove et al. |

(Continued)

FOREIGN PATENT DOCUMENTS

JP    2003-80280    3/2003

(Continued)

*Primary Examiner*—Fred Prince
(74) *Attorney, Agent, or Firm*—Oyen Wiggs Green & Mutala LLP

(57) ABSTRACT

This application relates to an apparatus and method for treating effluent. The effluent may be derived, for example, from an upstream secondary treatment plant. The apparatus employs a plenum positionable within a fluid-impervious container. The plenum includes a fluid filter portion containing a hydrophilic material, such as peat, capable of transporting effluent by capillary action and a fluid collection portion for receiving effluent from the upstream effluent source. The apparatus also includes a fluid wicking conduit containing hydrophilic material for wicking effluent from the fluid collection portion. The fluid wicking conduit may be configured so that any appreciable amount of effluent introduced into the apparatus will be wicked even if the amount is substantially less than the fluid holding capacity of the fluid collection portion of the plenum. This enables the apparatus to operate substantially continuously and passively so long as some effluent is resident in the plenum. At the same time, the fluid holding capacity of the fluid collection portion can be sized to accommodate periodic surges in effluent flow. The apparatus may further include a dispersal mound of soil and vascular aquatic plants covering or adjacent to the plenum. The invention functions as a vegetative tertiary filter.

11 Claims, 3 Drawing Sheets

U.S. PATENT DOCUMENTS

| | | |
|---|---|---|
| 6,152,653 A | 11/2000 | Henry et al. |
| 6,506,298 B2 | 1/2003 | Albert |
| 6,620,321 B2 | 9/2003 | Festa et al. |
| 2002/0139742 A1 | 10/2002 | Svirklys et al. |
| 2004/0262205 A1 | 12/2004 | Binau |

FOREIGN PATENT DOCUMENTS

| | | |
|---|---|---|
| WO | WO98/21153 | 5/1998 |
| WO | WO98/58881 | 12/1998 |
| WO | WO99/32406 | 7/1999 | ns # TERTIARY FILTER SEPTIC SYSTEM AND METHOD

Related Application

This application is a divisional of application Ser. No. 10/943022 filed 17 Sep. 2004 which issued as U.S. Pat. No. 7,407,577 on 5 Aug. 2008.

TECHNICAL FIELD

This application relates to a system and method for filtering wastewater derived from an effluent source, such as an upstream primary or secondary treatment plant. The invention employs peat or some other hydrophilic material capable of transporting effluent by capillary action.

BACKGROUND

Various types of septic systems employing peat are known in the prior art. Most prior art peat filtration devices load the effluent from the top of the filter, and allow it to drain down through the peat in order to effect filtration of the effluent. For example, Boyd et al. (U.S. Pat. No. 5,049,265) entitled "Effluent Treatment System" discloses a system for secondarily treating wastewater through a peat filter in which liquid waste from a septic tank is pumped onto the top of a treatment medium consisting of peat. The effluent is collected at the bottom of the peat filter. The system incorporates peat-based organic fibrous material having a relatively low absorptive capacity to promote drainage, and also uses an effluent distribution system to distribute effluent over the filter medium.

Festa et al. (U.S. Pat. No. 6,620,321) entitled "Biofilter System and Method For Treating Wastewater" describes a similar system in which effluent is pumped onto the filter from the top through sacks containing filtering material (often peat), and is allowed to drain out the bottom.

Albert (U.S. Pat. No. 6,506,298) entitled "Biofiltering System for Treating Wastewater Effluent" describes a method for treating effluent that allows continuous treatment. The effluent flows onto the top of a peat layer via a fluid flow regulator, and is permitted to drain into the ground below. A fluid flow regulator and distribution system disposed upstream from the peat ensures that the wastewater flows through the peat bed at a rate no greater than the peat bed biofiltering capacity.

Many effluent treatment systems which incorporate the use of plants are also know in the prior art. Simmering et al. (U.S. Pat. No. 5,690,827) entitled "Sewage Treatment System Using Peat and a Constructed Wetland" discloses a three-stage method of sewage treatment consisting of primary settling, passing the effluent through a peat filter, and then passing the filtered effluent through a sub-surface constructed wetland. In this method, the plants are used as a separate stage of treatment following passage through the peat filter.

Winters (WO 98/21153) entitled "Device for Cleaning Polluted Water" describes a method for treating water in a mobile container filled with multiple layers, including porous layers at the bottom of the container, a layer of peat, and then a layer of sand above the peat. The method includes the use of plants for purification, particularly reeds. The container is mobile so that it may be easily replaced. Effluent is pumped into a layer of sand near the top of the reservoir, and is collected by a discharge pipe located in the base of the container. The container is flooded to a certain level to create an appropriate ground water level to promote the activity of microorganisms at the interface between wet and dry soil.

Rambeck (WO 99/32406) entitled "Improved Effluent Treatment System" describes a two-stage treatment system, to treat both solid and liquid portions of effluent. The treatment is provided by gravel in layers, with microorganisms in the gravel, and plants. Solids are retained on top of the filter body, to be transformed into a soil-peat structure, while the liquid percolates through the filter for purification.

Wolverton (U.S. Pat. No. 4,415,450) entitled "Method for Treating Wastewater Using Microorganisms and Vascular Aquatic Plants" describes a system in which supernatant from a settling tank is pumped into the bottom of a container filled with rocks, pea gravel, and vascular aquatic plants for treatment. Effluent is purified by flowing upward through the tank, during which time it is subject to processing by anaerobic and facultative microorganisms, and the roots of at least one vascular aquatic plant.

While numerous effluent treatment systems are known in the prior art employing peat or vascular plants, they are not specifically sized and configured for tertiary effluent treatment or to accommodate both periodic surges in effluent flow and periods of low flow. Domestic wastewater production is typically uneven, with peak flows in the morning and early evening. Conventional treatment systems are typically under loaded for most of the day and overloaded for brief periods. Additionally, secondary treatment alone is insufficient to remove microcontaminants and nutrients. The need has therefore arisen for an improved tertiary filter system employing peat or other peat-like organic or synthetic materials which can operate continuously and passively, even during periods of low effluent inflow.

SUMMARY OF INVENTION

In accordance with the invention, an effluent treatment apparatus is described comprising a fluid-impervious container; a plenum positionable within the container, the plenum having a lower fluid collection portion having a fluid holding capacity and an upper fluid filter portion comprising a hydrophilic material capable of transporting effluent by capillary action; an inlet for introducing the effluent into the fluid collection portion; and a fluid wicking conduit containing the hydrophilic material and extending into the fluid collection portion, wherein the fluid wicking conduit wicks the effluent upwardly from the fluid collection portion. In one embodiment the container may have a bottom surface and the fluid collection portion is defined between the bottom surface and the fluid filter portion. The fluid wicking conduit may extend entirely or part-way between the fluid filter portion and the bottom surface. The fluid wicking conduit may be disposed, for example, in a central portion of the plenum.

The hydrophilic material may comprise peat or a peat-like organic or synthetic material, or a mixture thereof, capable of wicking effluent. In one embodiment the fluid wicking conduit wicks effluent upwardly when the volume of effluent in the fluid collection portion exceeds a threshold amount, wherein the threshold amount is substantially less than the fluid holding capacity of the fluid collection portion. For example, the threshold amount may be less than 5% of the fluid holding capacity such that the apparatus operates substantially continuously when effluent is introduced into the fluid collection portion through the inlet.

Preferably the inlet is in fluid communication with an upstream secondary treatment talk, such as a Nayadic® plant, receiving effluent from an effluent source. The fluid holding capacity may be sized to correspond with the maximum or average daily output of effluent produced by the effluent source. For example, the fluid holding capacity may be between 300-800 Imperial gallons for an average residential dwelling.

In one embodiment of the invention the plenum may comprise one or more subcompartments for holding and stabilizing the peat. The subcompartment(s) may be defined by wire frame elements.

The fluid filter portion may function as a vegetative tertiary filter. For example, aquatic plants, such as *Typha latifolia*, may be planted above the peat contained in the upper fluid filter portion. The apparatus may further include a dispersal mound containing soil disposed above or adjacent to the plenum, wherein at least some of the soil contacts the peat disposed in the fluid filter portion.

In one embodiment of the invention the fluid-impervious container may be defined by a fluid-impervious fabric, such as a synthetic rubber or plastic liner. In another embodiment the container may be a rigid structure, such as a concrete tank.

A method of treating effluent is also described comprising the steps of:

(a) providing an effluent treatment apparatus having a lower fluid collection portion having a fluid holding capacity and an upper fluid filter portion comprising a hydrophilic material capable of transporting effluent by capillary action;

(b) introducing effluent into the lower fluid collection portion; and (c) wicking effluent from the fluid collection portion to the fluid filter portion.

Wicking of the effluent may occur when the volume of effluent in the fluid collection portion exceeds a threshold amount, the threshold amount being substantially less than the fluid holding capacity of the fluid collection portion. In one embodiment the threshold amount is sufficiently small such that wicking of effluent occurs substantially continuously when effluent is introduced into the fluid collection portion.

In accordance with the method, the effluent may be derived from an upstream secondary treatment plant, such as a Nayadic® plant. At least some of the wicking may occur through a fluid wicking conduit extending at least partway into the fluid collection portion. The wicking may occur passively without the use of pumps.

BRIEF DESCRIPTION OF DRAWINGS

In drawings which illustrate embodiments of the invention, but which should not be construed as restricting the spirit or scope of the invention in any way.

FIG. 2(*b*) is an enlarged sectional view of the fluid wicking conduit portion of the effluent treatment apparatus of FIGS. 1 and 2.

DESCRIPTION

Figure 1:
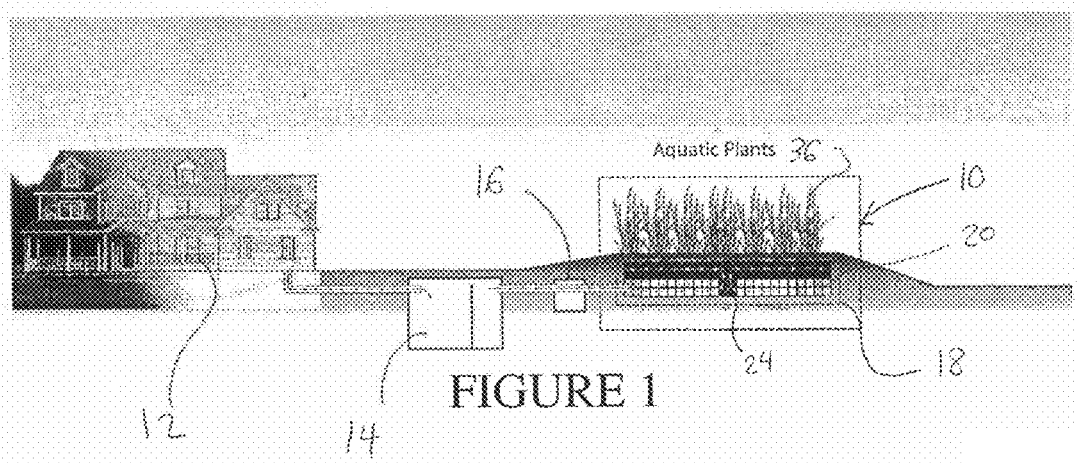
FIG. 1 is a schematic view showing an effluent source, a primary pretreatment tank, a secondary treatment tank and a tertiary effluent treatment apparatus constructed in accordance with the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This application relates to an effluent treatment apparatus 10 for tertiary treatment of effluent derived from an effluent source 12 and a related treatment method. The overall effluent treatment train is shown schematically in FIG. 1. In the illustrated embodiment, effluent source 12 is a residential dwelling.

Wastewater from effluent source 12 is first delivered to a pre-treatment tank 14. Tank 14 performs several functions. First, it acts as a trash tank receiving and holding recalcitrant material such as plastics, excess paper and other contaminants that may be present in the wastewater stream. Second, tank 14 functions to dilute any biologically problematic substances such as disinfectants and antimicrobial soaps. Third, tank 14 receives and holds effluent thereby smoothing water flows somewhat. Finally, tank 14 receives and assists with the liquefaction of particulate materials such as fibers.

The retention time of effluent derived from effluent source 12 in tank 14 may vary, but it is typically on the order of 12-48 hours. In one embodiment, tank 14 may consist of a sealed, two-chambered septic tank. Tank 14 may be constructed from any suitable material. For example, concrete tanks 14 are both reliable and cost-effective.

After pre-treatment in tank 14, effluent is then delivered to tank 16 for secondary treatment. By way of example, tank 16 may comprise a Nayadic® aerobic treatment plant manufactured by Consolidated Treatment Systems, Inc. Nayadic® treatment plants rely on suspended growth and direct oxidation principles to achieve organic carbonaceous material reduction and to nitrify virtually all ammonical nitrogen. The typical retention time of effluent in the Nayadic design is on the order of 1.4 days. Nayadic® treatment plants are certified under ANSI/NSF Standard 40, 1999, Class 1, to produce an effluent having less than 25 mg/L $CBOD_5$ (five day carbonaceous biochemical oxygen demand) and 30 mg/L TSS (total suspended solids) (National Sanitation Foundation, 1998). Nayadic® extended aeration secondary treatment plants are constructed from fiberglass. As will be appreciated by a person skilled in the art, other advanced secondary treatment plants could be substituted for the Nayadic® design.

After secondary treatment in tank 16, effluent is then delivered to the treatment apparatus 10 of the present invention for tertiary treatment. Apparatus 10 includes a fluid-impervious container 18. In one embodiment container 18 may be defined by a fluid impervious liner placed within a cavity excavated at the septic field installation site. For example, the liner could be constructed from ethylene propylene diene monomer (EPDM) rubber or other synthetic rubber or plastic sheeting. In the case of fluid impermeable soils such as clay, a liner may not be required. In other embodiments container 18 may be a rigid structure such a concrete or fiberglass tank. Container 18 is preferably installed at a subterranean location, although above-ground containers 18 could also be used. Surface placement minimizes soil disturbance and soil compaction.

Apparatus 10 further includes a plenum 20 which is positionable within container 18. In the illustrated embodiment plenum 20 is constructed from plastic coated galvanized wire frame elements 22, best shown in FIG. 3 The wire frame elements 22 define a plurality of subcompartments including a central fluid wicking conduit or "chimney" 24 (FIG. 2(b)). In use, peat 26 or some other hydrophilic material capable of transporting effluent by capillary action is placed within an upper subcompartment or subcompartments of plenum 20 to define an upper portion 28. As described further below, peat 26 or other hydrophilic material is also placed within wicking conduit 24. The wire frame elements 22 serve to contain and structurally support peat 26, particularly around the periphery of plenum 20 and within wicking conduit 24. The lower portion 30 of plenum 20 below upper portion 28 is open and constitutes a holding tank for receiving effluent derived from the upstream effluent treatment train.

Figure 2A:
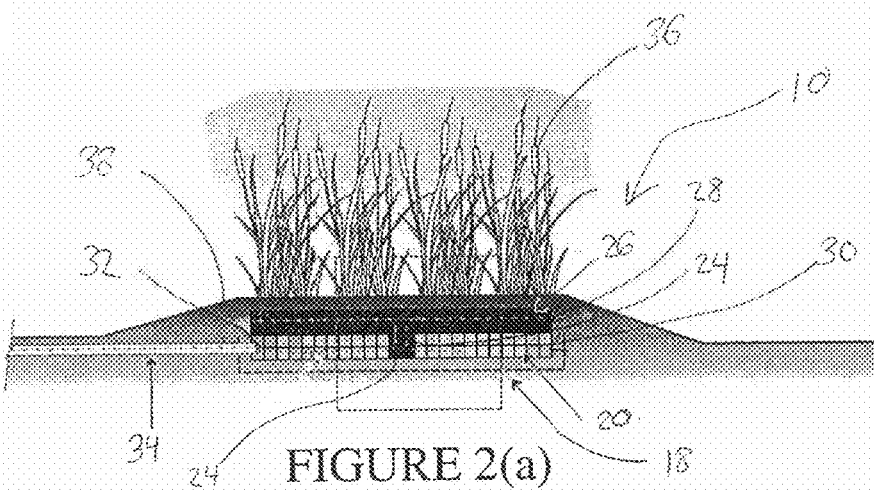
FIG. 2(*a*) is s sectional view of the tertiary effluent treatment apparatus of FIG. 1.
Figure 2B:
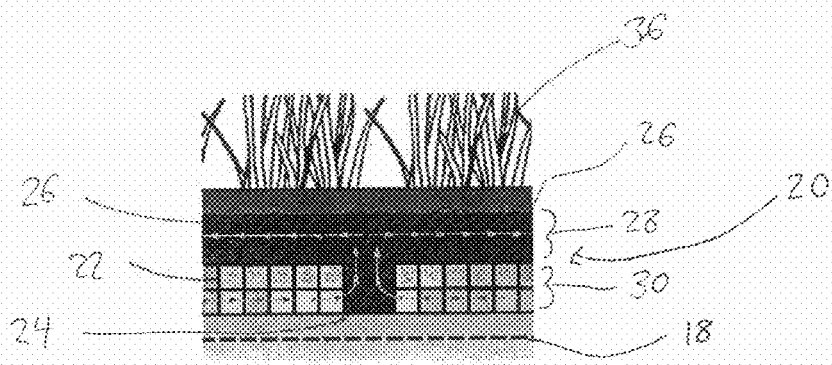
Figure 3:
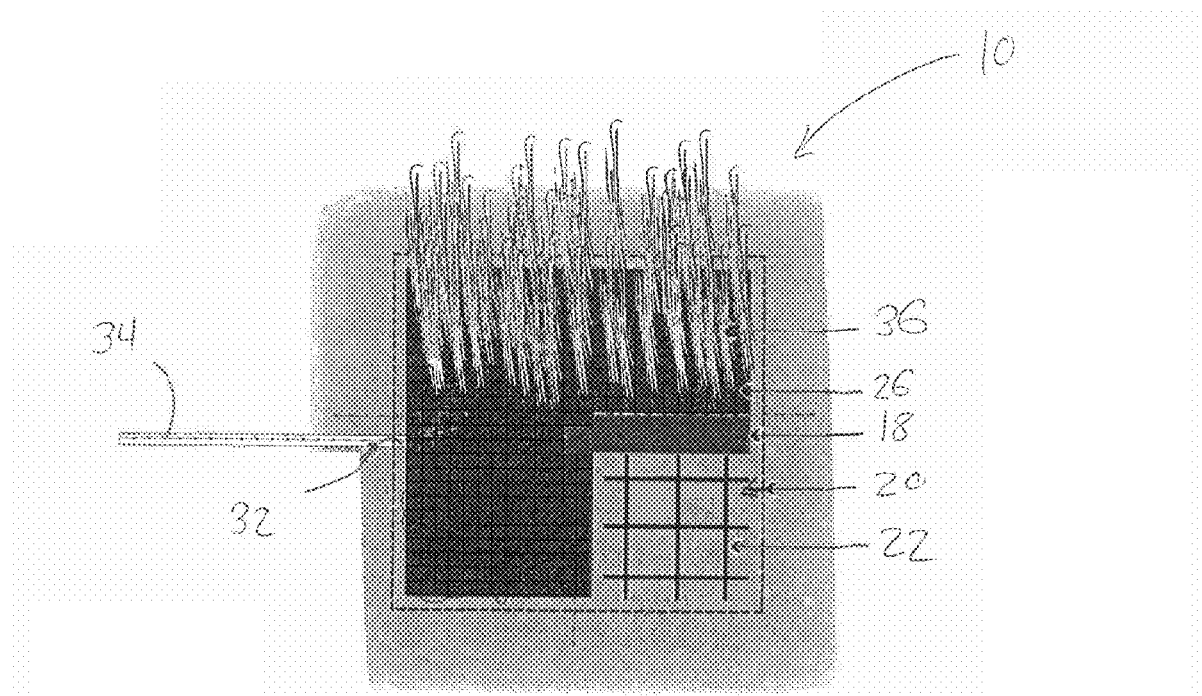
FIG. 3 is an enlarged, partially cut-away plan view of the effluent treatment apparatus of FIGS. 1 and 2.

In one embodiment of the invention hydrophilic geotechnical fabric is fitted vertically within wicking conduit 24 and spread horizontally at the interface between upper portion 28 and lower portion 30 before peat 26 is loaded into plenum 20 (FIG. 2(b)). The geotechnical fabric permits fluid effluent to pass therethrough (i.e. effluent wicking is not impeded) but prevents peat 26 from spilling from wicking conduit 24 or upper portion 28 into lower portion 30.

Effluent is introduced into plenum lower portion 30 through an inlet 32 at one end of a fluid delivery conduit 34. The other end of fluid delivery conduit 34 (not shown in FIGS. 2(a) and (b)) is connected to the upstream secondary treatment tank 16.

Figure 5:
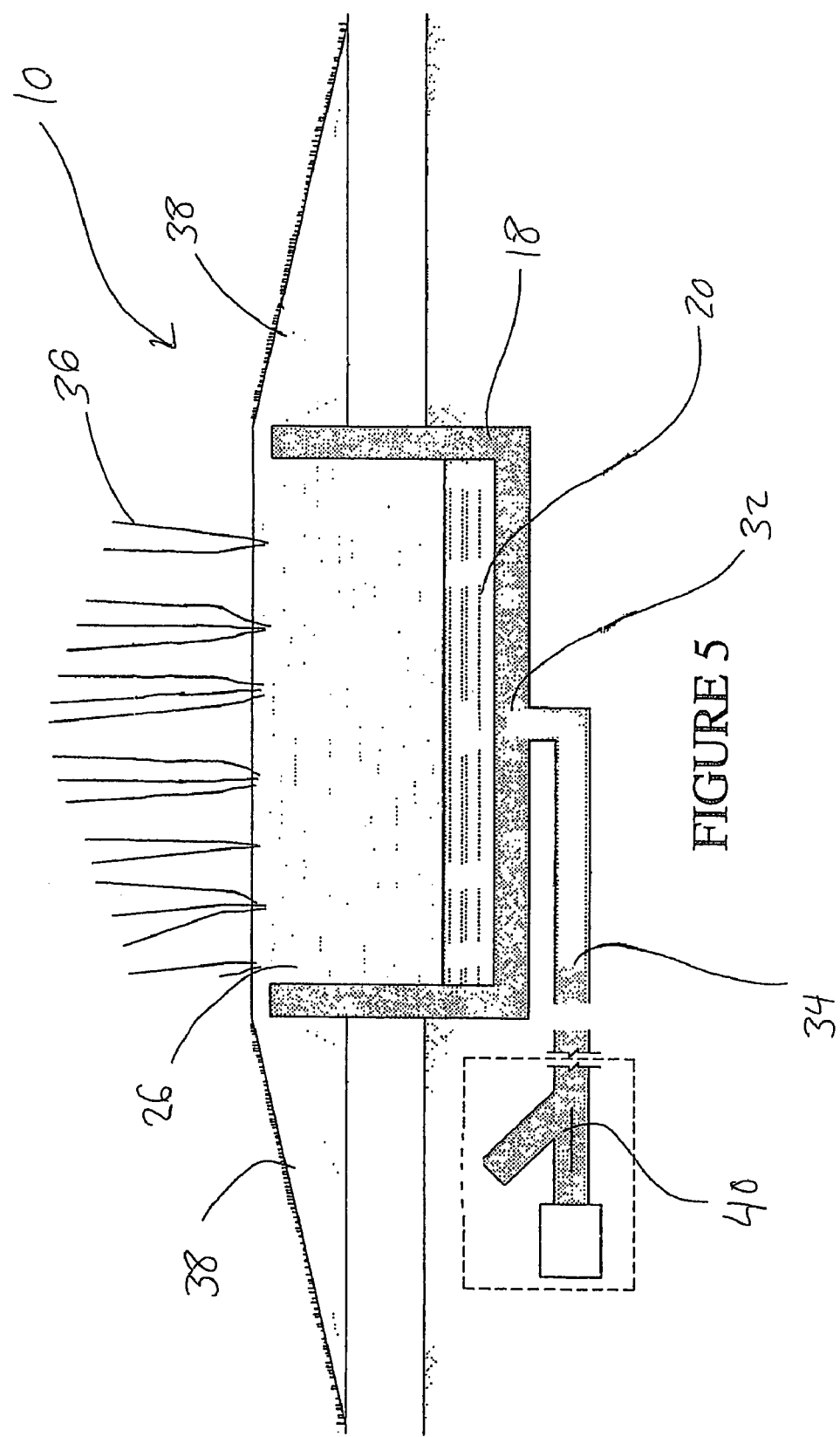
FIG. 5 simplified cross-sectional view of an alternative embodiment of the invention.

In the illustrated embodiment inlet 32 is located at a side location of container 18 and plenum 20. By introducing effluent into plenum 20 via the sidewall, conduit burial does not need to be as deep at the septic field installation site. Further, an inspection port may be located directly above the secondary effluent entry point. That way, if blockage occurs due to tree root intrusion or the like, the effluent entry point may be easily cleared and cleaned. FIG. 5 illustrates an alternative embodiment of the invention where the inlet 32 is located at a central bottom portion rather than a side portion of plenum 20.

Plenum 20 may be sized so that the volume of plenum lower portion 30 is sufficiently large to accommodate anticipated effluent flow rates. Typically, for residential effluent sources 12, peak water usage and effluent flow is in the morning and earlier evening. Plenum lower portion 30 functions as a surge chamber which may be sized to receive anticipated maximum, average, or between maximum and average effluent flow rates, thereby accommodating irregular flow patterns. For example, plenum lower portion 30 may be sized to receive and process effluent volumes on the order of between 300-800 Imperial gallons per day based on an anticipated average daily flow of about 300 Imperial gallons per day for a three bedroom dwelling. For example, plenum lower portion 30 may be sized to accommodate approximately a two day effluent residence time. As will be appreciated by a person skilled in the art, the size of apparatus 10 including plenum 20 may vary without departing from the invention.

In one embodiment of the invention, best illustrated in FIG. 2(b), is wicking conduit 24 of plenum 20 extends at least part-way into plenum lower portion 30 to contact effluent contained therein. In the illustrated embodiment, wicking conduit 24 extends downwardly to contact an interior bottom surface of container 18. As mentioned above, wicking conduit 24 includes peat 26. Due to the capillary wicking action of peat 26, effluent in contact with wicking conduit 24 will contact peat 26 (and/or the hydrophilic geotechnical fabric containing peat 26) and be drawn upwardly even if only a small volume of effluent is present in plenum lower portion 30, for example, if the flow rate of effluent through inlet 32 is low. Accordingly, effluent in lower portion 30 does not need to rise to the level of plenum upper portion 28 to begin the tertiary effluent filtering process (i.e. plenum lower portion 30 does not need to be full before any effluent will wick into peat 26). One advantage of this design is that apparatus 10 will operate passively and continuously so long as at least some flow of effluent is introduced into apparatus 10 from the upstream effluent treatment train or some effluent remains present in plenum 20. This capacity for "24/7" operation is an improvement over prior art effluent filtering designs. At the same time, as mentioned above, apparatus 10 can accommodate surges in effluent flow caused, for example, by diurnal increases in water consumption. By contrast, conventional systems may be underloaded for most of the day and overloaded for brief periods.

In one embodiment of the invention, the threshold volume of effluent required to be contained within apparatus 10 before it will be wicked upward through wicking conduit 24 is very low. For example, the threshold amount could be less than 5% of the total fluid holding capacity of plenum lower portion 30 (i.e. less than 1 cm of fluid depth). In one embodiment of the invention plenum 20 may be configured so any effluent entering lower portion 30 flows, such as by gravity, toward the lower portion of wicking conduit 24.

As will be appreciated by a person skilled in the art, wicking conduit 24 may be alternatively disposed other than in a central portion of plenum 20. For example, if apparatus 10 were installed on a sloped site, wicking conduit 24 could be disposed near a downslope edge of plenum 20 to wick up any effluent which flows into its vicinity by gravitational forces.

In another alternative embodiment of the invention, the amount of effluent flowing into treatment apparatus 10 may be controlled by a flow regulator. For example, a surge chamber could be provided upstream from apparatus 10. This arrangement may be particularly advantageous in the case of large installations. A pump controlled by a timer could be employed to periodically introduce effluent from the surge chamber into inlet 32 at a constant or near constant rate. In this embodiment, the volume of lower portion 30 of plenum 20 could be reduced since it is not required to function as a surge chamber. This embodiment may enhance the efficiency of the fermentation process taking place within plenum 20 since the microorganisms present in peat 26 will receive nutrients at a relatively consistent rate. On the other hand, systems employing pumps or other mechanical flow regulators are more vulnerable to mechanical breakdown than purely passive systems.

The volume of peat 26 required for effective operation of plenum upper portion 28 and wicking conduit 24 may be determined depending upon expected hydraulic retention times. Peat 26 provides positive physical filtration, adsorption, a plethora of fixed film attachment sites and supplies carbon for denitrification. The myriad of flow pathways through peat 26 ensures long effluent residence times and multiple contacts with microphagous organisms. For example, as shown in FIG. 2(b), effluent has a relatively long flow path through peat 26 present in wicking conduit 24 and/or upper portion 28 before it migrates to the surrounding environment. As will be appreciated by a person skilled in the art, other hydrophilic materials capable of transporting effluent by capillary action may be substituted for peat 26 or mixed with peat 26 in alternative embodiments of the invention. Such other materials may include organic materials having wicking properties similar to peat and hydrophilic synthetic materials such as geotechnical fabric. By way of further example, sawdust may be used as part of the wicking material.

As illustrated in the drawings, vascular aquatic plants 36 may be planted in peat 26 contained within plenum upper portion 28. Various species of aquatic emergent plants may be used, such as *Typha latifolia*. Plants 36 fulfill a number of roles including replenishment of peat 26, phytoremediation, maintaining fluid channels open, direct nutrient uptake, evapotranspiration and providing a large surface area for microbial film attachment on root surfaces. Of course, plants 36 may also be species selected to be aesthetically pleasing. Once established, the roots of plants 36 will grow into and stabilize peat 26 and provide structural integrity to the entire effluent treatment apparatus 10.

Apparatus 10 further includes a dispersal field 38 covering or adjacent to (e.g. surrounding) upper portion 28 of plenum 20. Dispersal field 38 may comprise permeable topsoil placed over peripheral portions of container 18 and plenum 20. This ensures intimate contact between peat 26 and the topsoil. Unlike sand, topsoil includes resident soil organisms and may be sodded with a deep-rooted grass such as perennial turf rye grass. Water will infiltrate into the sod at the edge of container 18 via capillary action and hence into other regions of the dispersal field 38 having a lower moisture concentration. The present invention has been shown to be very effective in producing effluent having very low to non-detectable suspended solids, biological oxygen demand and fecal coliform bacteria.

Figure 4:
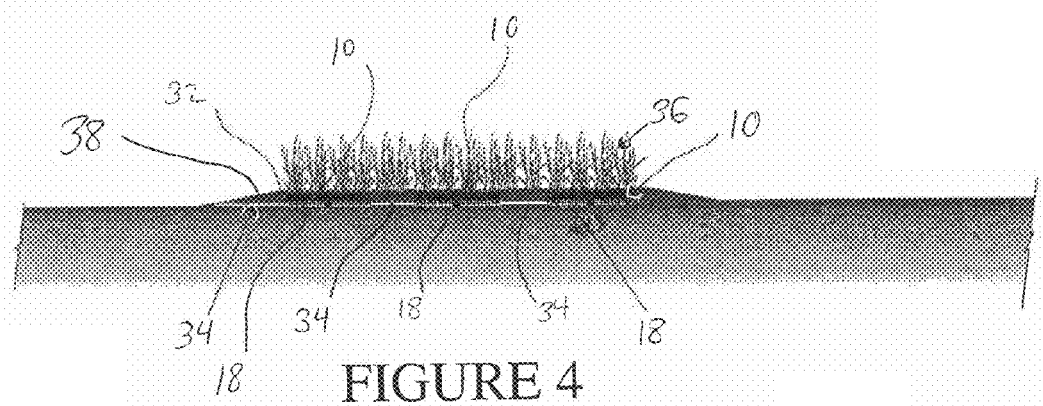
FIG. 4 is a sectional view of a plurality of effluent treatment apparatuses arranged in series in fluid communication with each other for treating effluent derived from a common upstream effluent source.

FIG. 4 illustrates an alternative embodiment of the invention wherein a plurality of effluent treatment apparatuses 10 as described above are arranged in series. In this embodiment apparatuses 10 are in fluid communication (i.e. they are connected by a common fluid delivery conduit 34). Thus the incoming effluent may be distributed amongst a plurality of plena 20. The size of the lower portion 30 of each plenum 20 may be accordingly reduced (i.e. the surge chamber is effectively distributed at multiple locations). Viewed from the surface the vascular aquatic plants 36 may cover the entire dispersal field installation region and it will not be apparent that multiple subterranean effluent treatment apparatuses 10 are installed.

FIG. 5 describes an alternative embodiment of the invention where fluid-impervious container 18 is a concrete tank and effluent is introduced into plenum 20 from a lower portion rather than a side portion of container 18. A shut-off valve 40 may be provided for regulating flow through the upstream fluid delivery conduit 34. In this embodiment plenum 20 must be full to capacity with effluent before effluent will wick into the overlying layer of peat 26 and there is a diminished capacity to accommodate effluent surges compared to the embodiments described above.

In operation, the effluent treatment illustrated in FIG. 1 may operate passively by gravity flow. This decreases capital and operational costs and enhances reliability. Alternatively, one or more pumps and/or valves could be used to regulate effluent flow. For example, a pump could be employed in the case of a negative slope between the primary treatment tank 14 or secondary treatment tank 16 and the effluent treatment apparatus 10 at the installation site (FIG. 1).

In an alternative embodiment of the invention, effluent treatment apparatus 10 may receive effluent from a primary rather than a secondary treatment source. For example, apparatus 10 may be used as a temporary replacement for a preexisting septic field. Many existing septic fields fail to operate as intended due to gradual formation of an anaerobic biomat therein. This failed or failing state can be reversed by allowing the septic field to dry out, such as over the summer months. As the water dissipates, oxygen is drawn in to replace it. This is turn allows aerobic organisms to replace the anaerobic biomat, thereby restoring permeability to the septic field. In order to enable the existing septic field to dry out, apparatus 10 may be connected to the primary treatment tank. In this case apparatus 10 will function as both a secondary treatment apparatus removing carbon and a tertiary treatment apparatus removing nutrients and microcontaminants. Unless supplementary oxygen is provided to apparatus 10, apparatus 10 may eventually become plugged up with an anaerobic biomat. However, by this time (e.g. at the end of the summer season) the rejuvenated existing septic field may be brought back into service.

In the illustrated embodiments described above, the portion 28 of plenum 20 containing peat 26 or other hydrophilic material exhibiting capillary action is disposed above the plenum portion 30 functioning as a fluid collection chamber. As will be apparent to a person skilled in the art, in other embodiments of the invention portions 28, 30 could be disposed side by side or in some other geometric relation. In such embodiments, effluent could be initially wicked away from plenum portion 30 horizontally rather than vertically. Such an arrangement may permit enhanced effluent throughput since wicking would not be occurring in a direction directly opposite gravitational forces.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of treating effluent derived from an effluent source comprising:
    (a) providing an effluent treatment apparatus having a lower fluid collection portion having a fluid holding capacity and an upper fluid filter portion comprising a hydrophilic material capable of transporting effluent by capillary action;
    (b) introducing said effluent into said lower fluid collection portion through an inlet in fluid communication with said effluent source;
    (c) wicking said effluent from said fluid collection portion to said fluid filter portion; and
    (d) filtering said effluent by moving said effluent by capillary action through a plurality of flow paths in said fluid filter portion to remove contaminants from said effluent.

2. The method as defined in claim 1, wherein said wicking occurs when the volume of said effluent in said fluid collection portion exceeds a threshold amount, wherein said threshold amount is substantially less than said fluid holding capacity.

3. The method as defined in claim 2 wherein said threshold amount is sufficiently small such that said wicking occurs substantially continuously when said effluent is introduced into said fluid collection portion.

4. The method as defined in claim 1, wherein said effluent source is an upstream secondary treatment plant.

5. The method as defined in claim 4, wherein said secondary treatment plant is a Nayadic® plant.

6. The method as defined in claim 1, wherein said wicking occurs passively without the use of pumps.

7. The method as defined in claim 1, wherein at least some of said wicking occurs through a fluid wicking conduit containing said hydrophilic material and extending into said fluid collection portion.

8. The method as defined in claim 1, wherein said hydrophilic material comprises peat.

9. The method as defined in claim 8, wherein said peat comprises microorganisms present in said flowpaths and adapted to filter said contaminants.

10. The method as defined in claim 1, wherein said inlet is in continuous fluid communication with said effluent source to receive any effluent flowing from said effluent source.

11. The method as defined in claim 1, further comprising, after said filtering, delivering said effluent to vascular aquatic plants.

* * * * *